No. 857,746. PATENTED JUNE 25, 1907.
T. D. McCALL.
RECEPTACLE COVER.
APPLICATION FILED AUG. 11, 1906.
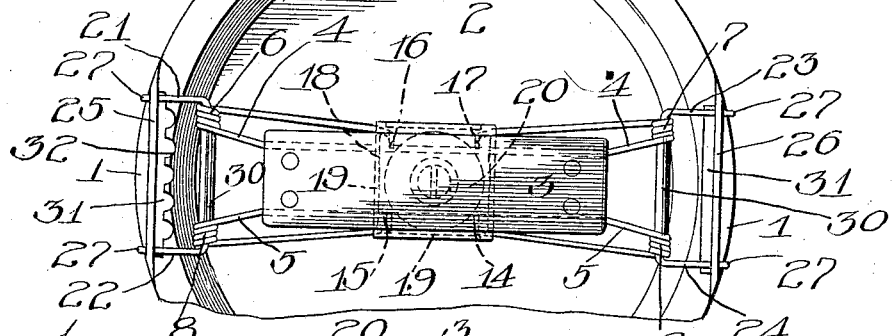
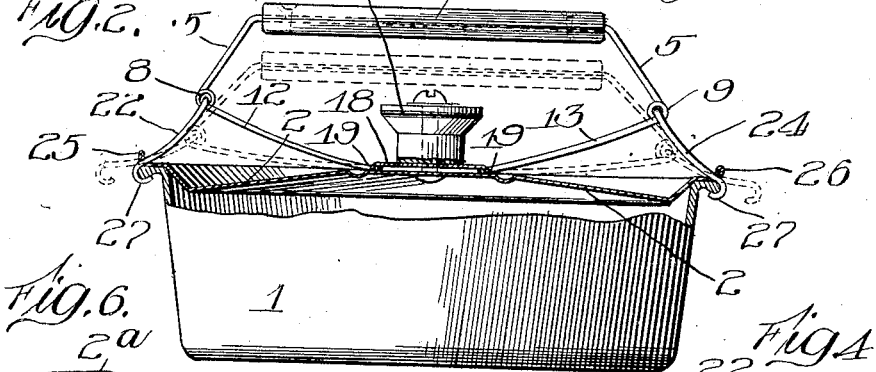
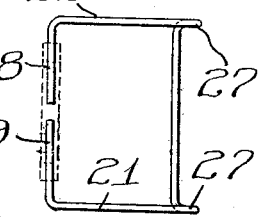
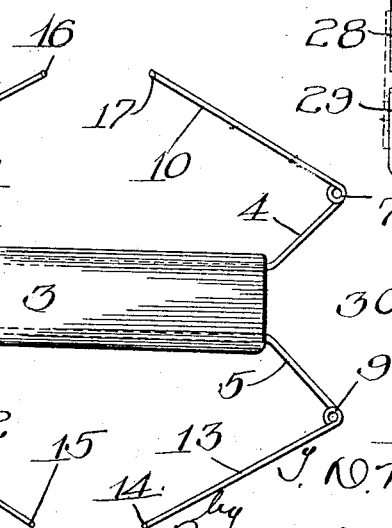
Witnesses: Inventor:
J. D. McCall

UNITED STATES PATENT OFFICE.

THADDEUS D. McCALL, OF CHICAGO, ILLINOIS.

RECEPTACLE-COVER.

No. 857,746.			Specification of Letters Patent.			Patented June 25, 1907.

Application filed August 11, 1906. Serial No. 330,144.

*To all whom it may concern:*

Be it known that I, THADDEUS D. MCCALL, a citizen of the United States, residing at Chicago, in the county of Cook and State of Illinois, have invented certain new and useful Improvements in Receptacle-Covers, of which the following is a full, clear, and exact specification.

This invention relates to improvements in covers for receptacles, such as pots, kettles, pans, and other articles of kitchen ware, and the like, and has for an object to provide a simple, cheap and efficient means by which the covers of such receptacles may be securely attached and held firmly in position, and at the same time be readily detached.

A further object is to provide an improved form of receptacle cover capable of firm attachment to receptacles, and provided with means to enable the receptacle to be safely and conveniently manipulated for the purpose of draining the liquid contents therefrom.

To the attainment of these ends, and the accomplishment of other new and useful objects, as will appear, the invention consists in the features of novelty in the construction, combination and arrangement of the several parts, hereinafter more fully described and claimed, and shown in the accompanying drawings, illustrating an exemplification of this invention, and in which:—

Figure 1 is a plan view of the device applied to a receptacle. Fig. 2 is a side elevation with parts of cover and receptacle broken away. Figs. 3, 4 and 5 are detail views of the operative parts, showing the manner in which they may be detached from the cover, for the purposes of cleaning and convenience in packing. Fig. 6 shows a modified form of constructing a cover, for the attachment of the holding devices.

A common form of receptacle 1, is shown provided with cover 2 embodying one form of the invention, in which 3 is a handle preferably of wood or other material not a good conductor of heat. The handle is supported by the members 4, 5, which preferably pass longitudinally therethrough, and are firmly held but yet capable of being folded in the manner shown in Fig. 3. The members 4, 5 are formed of steel or brass wire or other convenient material and may be elastic, and extend outwardly and downwardly from the handle 3, and are provided at their outer extremities with the coiled eyes 6, 7, 8 and 9. The downwardly and inwardly extending branches 10, 11, 12 and 13, and the inwardly extending hooks 14, 15, 16 and 17 for attachment to the cover, may be formed integrally with the members 4 and 5 the rectangular stamped metal plate 18 takes the hooked portions 14, 15, 16 and 17 and is provided with the downwardly extending flanges 19 for the purpose of raising the plate above the cover a sufficient distance to permit the insertion of the hooks 14, 15, 16 and 17 thereunder. The members 19 should be cut away near the corners of the plate to allow the insertion of the hooks which will, by reason of their elasticity and tendency to come together when pressure is exerted on the handle, be held firmly under the plate.

The plate 19 may be fastened to the cover in any convenient manner. A fixed member or knob 20 of common form is placed on top of the plate to enable the operator to grasp both handle and knob in one hand at the same time. The members 21, 22, 23 and 24 are pivoted at 6, 7, 8 and 9, and pass under the supporting members 25 and 26 on the cover. At their outer extremities hooks 27 are formed to engage over the rim of a receptacle. These members may be formed in integral pairs, as shown in detail in Fig. 4. For convenience in assembling and dis-assembling, the ends 28, 29 are left free to be separated, and when assembled may be protected by the ferrule 30. The supporting members 25 and 26 may be formed integral with the cover by cutting the slot 31, as shown, or may be affixed thereon, as shown in Fig. 6.

The movement of the parts in attaching and detaching the cover is shown by the dotted lines in Fig. 2. The downward movement of the handle resisted by the pressure of the elastic supporting members forces the pivotal points 6 7, 8, 9, downwardly and outwardly which acts to move the clasping members and their hooks 27 outwardly and away from the rim of the receptacle, and enables the cover to be readily applied or removed. When the handle is released, the parts return to normal and cause the hooks 27 to engage firmly with the rim of the receptacle.

It will be noted that in the present embodiment of the invention, the members 4 and 5, pivotal loops 6, 7, 8, 9, the spring members 10, 11, 12, 13 and the inwardly extending hooks 14, 15, 16, 17 are formed of continuous rods or wires. It is not desired, however, to limit the invention to this specific construction, as it will be apparent to those versed in the art that the various members enumerated may be constructed independently of each other and joined together in any convenient manner. For example, the material in the handle member 3 may be readily prolonged or extended and carry at its extreme ends convenient loops or eyes corresponding to 6, 7, 8 and 9. In the present embodiment of the invention, the members 4 and 5 are described as being elastic but it will be apparent that elasticity in these parts is not essential in order to make the device operative. It is essential, however, that the members 10, 11, 12, 13 be constructed of elastic material capable of normally tending to hold the handle 3 in the direction apart from the cover plate. Even though the complete handle, consisting of the member 3 and the members 4 and 5, be constructed in one piece and without elasticity, it will be seen that when the handle approaches the cover plate, the hook carrying members 21, 22, 23, 24 will be operated to move the hooks 27 away from the rim of the receptacle.

One or more indentations, as shown at 32, may be cut in the cover near the edge, preferably adjacent the points of attachment of the clasping members for the purpose of draining liquid contents from receptacles without removing the cover. The firm manner in which the cover is attached in connection with the convenient handle makes this a very desirable feature of the device.

In order that the invention might be fully understood, the details of an embodiment thereof have been thus specifically described, but

What I claim is:—

1. In a device of the character described, the combination with a cover, of clutching means adapted to engage the walls of a receptacle, elastic means for holding the clutching means, normally in engagement, and means attached to the cover and operatively related thereto for overcoming the resistance of the elastic means to release the clutching means.

2. The combination of a cover, a plurality of spring actuated hooks adapted to engage normally the walls of a receptacle, a fixed member on the cover and means operatively related to the fixed member for releasing the spring actuated hooks.

3. In a device of the character described, the combination with a cover, of clutching means permanently secured to the cover and adapted to engage the walls of a receptacle, and elastic means operatively related to the cover and the clutching means whereby the clutching means is normally adapted to engage the walls of the receptacle under tension.

4. In a device of the character described, the combination with a cover, of clutching means permanently secured to the cover and adapted to engage the walls of a receptacle, elastic means operatively related to the cover and the clutching means whereby the clutching means is adapted to be held normally under tension in contact with the walls of the receptacle, a handle on the elastic means, and a fixed member on the cover adjacent to the handle and adapted to co-operate therewith in releasing the tension on the clutching means.

5. In a device of the character described the combination with a cover, of a movable handle, clutching means pivotally connected with the said handle, and an elastic means interposed between the handle and the cover.

6. In a device of the character described, the combination with a cover, of clutching means permanently attached to the cover and adapted to secure the cover to a receptacle embodying a movable handle and a plurality of elastically controlled hooks pivotally connected with the said handle.

7. In a device of the character described the combination with a cover, of clutching means permanently secured thereto and embodying a plurality of elastically controlled hooks, a movable handle operatively controlling the said hooks, and a fixed handle secured to the cover with which the said movable handle is adapted to co-operate.

In testimony whereof I have signed my name to this specification, in the presence of two subscribing witnesses, on this 8" day of August A. D. 1906.

THADDEUS D. McCALL.

Witnesses:
GEORGE DRUSCHKE,
CHAS. W. ACKLEY